W. H. PHENICE.
COVER FOR RECEPTACLES.
APPLICATION FILED APR. 22, 1908.
900,583.
Patented Oct. 6, 1908.
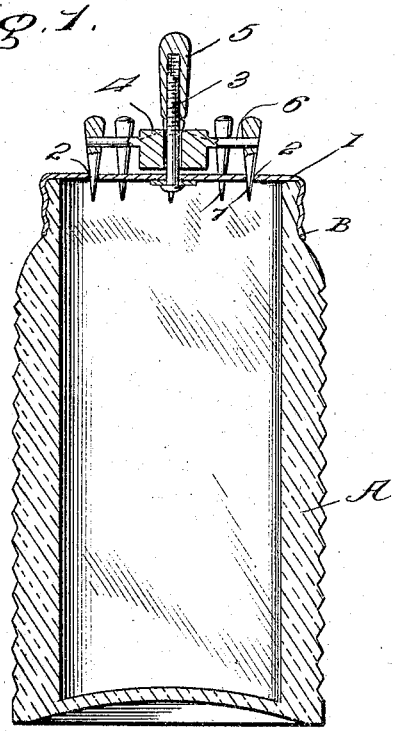
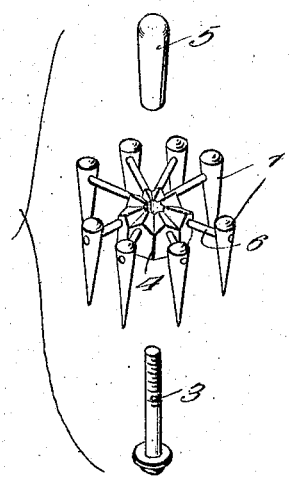

UNITED STATES PATENT OFFICE.

WILLIAM H. PHENICE, OF VERNON, INDIANA, ASSIGNOR OF ONE-HALF TO ALFRED B. SIMPSON, OF VERNON, INDIANA.

COVER FOR RECEPTACLES.

No. 900,583.  Specification of Letters Patent.  Patented Oct. 6, 1908.

Application filed April 22, 1908. Serial No. 428,658.

*To all whom it may concern:*

Be it known that I, WILLIAM H. PHENICE, a citizen of the United States, residing at Vernon, in the county of Jennings and State of Indiana, have invented certain new and useful Improvements in Covers for Receptacles, of which the following is a specification.

This invention contemplates certain new and useful improvements in receptacles for powdered or granulated substances such as spices or the like, and the object of the invention is a perforated cap, the perforations of which are normally closed when the receptacle is in an upright position, so as to prevent the admission of dust or air to the receptacle, and which are automatically opened by peculiar means upon inverting the receptacle, thereby permitting the inclosed substance to escape freely therefrom. And a further object of the invention is an improved device of the character described which may be adjusted to regulate the extent to which the perforations will be opened and thereby control the flow of the substance therethrough.

With these and other objects in view that will more fully appear as the description proceeds, the invention consists in certain constructions and arrangements of the parts that I shall hereinafter fully describe and then point out the novel features thereof in the appended claims.

For a full understanding of the invention and the merits thereof, and to acquire a knowledge of the details of construction, reference is to be had to the following description and accompanying drawing, in which:

Figure 1 is a vertical section of a receptacle embodying my invention; and, Fig. 2 is a perspective view showing the shank, collar and nut in juxtaposition.

Corresponding and like parts are referred to in the following description and indicated in all the views of the drawing, by the same reference characters.

Referring to the drawing, A designates a receptacle of the type described, which may be of any desired construction or design, and which in the present embodiment of the invention is formed in its periphery, near its upper open end, with threads B. The cover of this receptacle is in the form of a screw cap 1 which is designed to be engaged with the threads B, so as to be detachably secured to the receptacle, said cap being formed with a circular series of equally spaced perforations 2 that are preferably larger than those in the screw caps of the ordinary devices of this type. A threaded shank 3 is rigidly secured to the cap 1, and extends perpendicularly thereto, a collar 4 encircling such shank and being mounted for longitudinal movement thereon. The collar 4 is retained on the shank by a nut 5 working upon the latter. This collar is formed with a plurality of radially extending arms 6 which project outwardly toward the respective perforations 2, and which are formed at their outer ends with perpendicularly disposed inwardly tapering plugs 7 that are arranged to be received in the respective perforations. When the receptacle is in an upright position, the plugs 7 fall into the perforations and are seated in the latter, so as to effectually close the same and prevent the admission of dust or the like to the receptacle. Upon the inversion of the receptacle, the collar 4 falls against the nut 5, and this carries the plugs 7 outwardly in the perforations 2, so as to open or partially open the latter and permit the escape of the inclosed substance, the tapering formation of the plugs serving to spread or distribute the substance as it flows through the perforations. It will be observed that by adjusting the nut 5 upon the shank 3, the longitudinal movement of the collar 4 may be limited upon the latter, so as to limit the outward movement of the plugs in the perforations, and thus regulate the extent to which the latter are opened or close the same entirely.

From the above description, in connection with the accompanying drawing, it will be apparent that I have provided a simple, durable and efficient construction of device which is particularly applicable to pepper or salt cruets or the like, which is positive in action, and which may be easily and cheaply manufactured.

Having thus described the invention, what I claim is:

1. The combination with a perforated cover, of a longitudinally disposed shank secured thereto, a collar loosely encircling the shank and arranged for longitudinal movement thereon, a plurality of arms carried by the collar and formed with plugs adapted to be seated in the respective perforations, and means carried by the shank for limiting the longitudinal movement of the collar thereon, as and for the purpose specified.

2. A receptacle of the character described, having a perforated cover, a shank rigidly secured thereto, a collar encircling the shank and arranged to move outwardly thereon upon the inversion of the receptacle, and a plurality of arms carried by said collar and formed with tapering plugs normally seated in the respective perforations to close the same, the said plugs being arranged to be carried outwardly in the perforations, upon the outward movement of the collar.

3. A receptacle of the character described, having a perforated cover, a threaded shank rigidly secured to the cover and perpendicularly disposed thereto, a nut working on said shank, a collar encircling the shank and arranged to be carried outwardly against the nut, upon the inversion of the receptacle, and a plurality of arms carried by the said collar, and formed with tapering plugs normally seated in the respective perforations, to close the same, the said plugs being arranged to be carried outwardly in the perforations, upon the outward movement of the collar.

4. A receptacle of the character described, having a perforated cover, a shank rigidly secured thereto, a collar loosely mounted upon the shank and arranged to move outwardly thereon upon the inversion of the receptacle, arms carried by said collar and formed with tapering plugs normally seated in the perforations in the cover, the said plugs being arranged to be carried outwardly in the perforations upon the outward movement of the collar, and adjustable means for limiting the outward movement of the collar, as and for the purpose specified.

In testimony whereof I affix my signature in presence of two witnesses.

WILLIAM H. PHENICE. [L. S.]

Witnesses:
   GEORGE W. SHAFFER,
   ALONZO C. RUSH.